(12) United States Patent
Chiron et al.

(10) Patent No.: US 6,313,205 B1
(45) Date of Patent: Nov. 6, 2001

(54) COMPOSITION OF DIENE RUBBER REINFORCED WITH A WHITE FILLER, COMPRISING A MULTI-FUNCTIONALIZED POLYORGANOSILOXANE AS COUPLING AGENT (WHITE FILLER/ELASTOMER)

(75) Inventors: Frédéric Chiron; Claude Laforet, both of Clermont-Ferrand; Jean-Luc Mangeret, Riom, all of (FR)

(73) Assignee: Compagnie Generale des Etablissements Michelin-Michelin & Cie, Cedex (FR)

( * ) Notice: Subject to any disclaimer, the term of this patent is extended or adjusted under 35 U.S.C. 154(b) by 0 days.

(21) Appl. No.: 09/480,768

(22) Filed: Jan. 10, 2000

Related U.S. Application Data

(63) Continuation of application No. PCT/EP98/04308, filed on Jul. 10, 1998.

(30) Foreign Application Priority Data

Jul. 11, 1997 (FR) .................................................. 97 09047
Feb. 4, 1998 (FR) .................................................. 98 01452

(51) Int. Cl.$^7$ ....................................................... C08K 5/24
(52) U.S. Cl. .......................... 524/262; 524/437; 524/506; 524/526; 524/573; 524/575
(58) Field of Search ..................................... 524/262, 437, 524/506, 526, 573, 575

(56) References Cited

U.S. PATENT DOCUMENTS

| | | | |
|---|---|---|---|
| 4,725,630 | * 2/1988 | Magee et al. | 522/99 |
| 4,753,976 | 6/1988 | Yoshioka et al. . | |
| 6,191,247 | * 2/2001 | Ishikawa et al. | 524/262 |

FOREIGN PATENT DOCUMENTS 2094859A    2/1972   (FR) .

\* cited by examiner

*Primary Examiner*—Bernard Lipman
(74) *Attorney, Agent, or Firm*—BakerBotts, L.L.P.

(57) ABSTRACT

The invention concerns a rubber sulfur-vulcanizable composition designed for manufacturing tire treads, comprising at least a diene elastomer, a white filler as reinforcing filler and as coupling agent (white filler/elastomer) a multifunctionalized polyorganosiloxane comprising per molecule: a) at least a first siloxyl unit bearing, on the silicon atom, at least one linear or branched $C_1$–$C_{15}$ alkoxyl radical; and b) at least a second siloxyl unit bearing, on the silicon atom, at least one radical of general formula Z—SH, Z being a linear or branched divalent hydrocarbon, comprising preferebly 2 to 30 carbons.

22 Claims, 1 Drawing Sheet

COMPOSITION OF DIENE RUBBER REINFORCED WITH A WHITE FILLER, COMPRISING A MULTI-FUNCTIONALIZED POLYORGANOSILOXANE AS COUPLING AGENT (WHITE FILLER/ELASTOMER)

This is a continuation of copending application Ser. No. PCT/EP98/04308 now WO 99/02602, filed Jul. 10, 1998.

FIELD OF THE INVENTION

The present invention relates to sulfur-vulcanizable rubber compositions intended for the manufacture of tires or semi-finished products for tires, in particular, treads of such tires.

It relates more particularly to novel diene rubber compositions reinforced with a white filler and comprising a coupling agent (white filler/elastomer)based on a multifunctionalized polyorganosiloxane("POS") bearing both alkoxy and mercapto-alkyl (or alkyl-thiol) functions.

(Multi)functionalizedPOS are widely known and have been described in references, in particular, patent application WO 96/16125, which describes the multifunctionalisation of POS. WO96/16125 discloses the preparation of POS comprising, in particular, ≡Si—(O-alkyl) and ≡Si—(chain with various sulfur-containing groups, in particular SH) functional units. The —(O-alkyl) function is introduced onto an appropriate polyhydrogeno-organosiloxane by a dehydrogeno-condensation reaction starting with the alcohol from which the —(O-alkyl) function is derived (in this stage a fraction of the original ≡SiH groups are substituted by alkoxy functions). Then the—(chain with various sulfurized groups) function is introduced by hydrosilylation of an olefin bearing the sulfur-containing group, by the remaining ≡SiH groups.

Since fuel economy and the need to protect the environment have become priorities, it is desirable to produce elastomers with good mechanical properties and as low a hysteresis as possible so that they can be used in the form of rubber compositions suitable for the manufacture of various semi-finished products involved in the constitution of tires, such as, for example, underlayers, calendering rubbers or sidewalls or treads, and to obtain tires with improved properties, in particular, reduced rolling resistance.

Numerous solutions have been proposed to achieve this objective, in particular, those concentrating on the use of elastomers modified by agents such as coupling, starring or functionalizing agents, with carbon black as the reinforcing filler, with the aim of obtaining a good interaction between the modified elastomer and the carbon black. It is, in fact, generally known that to obtain the optimum reinforcement properties imparted by a filler, the latter should be present in the elastomer matrix in a final form, which is both as finely divided as possible and distributed as homogeneously as possible. Now, such conditions can only be realized to the extent that on the one hand, the filler has very good ability to be incorporated into the matrix during mixing with the elastomer and to become disagglomerated and, on the other hand, to be dispersed homogeneously in the elastomer.

It is well known that carbon black has such abilities, which is generally not true of white fillers. For reasons of mutual attraction, white filler particles, especially silica particles, have an irritating tendency to agglomerate together within the elastomer matrix. These interactions have the harmful consequence of limiting the dispersion of the filler and decreasing its reinforcing properties to a far lower level than that which it would be theoretically possible to achieve if all the (white filler/elastomer) bonds that could be created during the mixing operation were in fact obtained. Furthermore, these interactions tend to increase the consistency of the rubber compositions and therefore to make them more difficult to work in the raw state than in the presence of carbon black.

However, interest in compositions reinforced with white filler(s) was greatly revived by the publication of European Patent Application EP-A-O 501 227, which discloses a sulfur-vulcanizable diene rubber composition, reinforced with a special precipitated silica of the highly dispersible type, which makes it possible to make a tire or tread with much better rolling resistance, without affecting the other properties, in particular those of adhesion, endurance and wear resistance.

The recently published European Patent Application EP-A-0 810 258 discloses a novel diene rubber composition reinforced by another special white filler, in this case a specific, highly dispersible alumina ($Al_2O_3$) with which tires or treads with a similar excellent balance of contradictory properties can also be produced.

The use of these specific and highly dispersible silicas or aluminas as reinforcing fillers, whether or not as the major component, has reduced the difficulty of working the compositions that contain them, but they are still more difficult to work than compositions filled conventionally with carbon black.

In particular, it is necessary to use a coupling agent, also known as a bonding agent, whose purpose is to ensure the connection between the surfaces of the white filler particles and the elastomer, while also facilitating the dispersion of the white filler within the elastomer matrix.

The term "coupling agent" (white filler/elastomer) is understood by the person skilled in the art to mean an agent capable of establishing a sufficient chemical and/or physical connection between the white filler and the elastomer. Such a coupling agent, which is at least bifunctional, may for example have the simplified general formula "Y—T—X", in which:

Y represents a functional unit ("Y" function) capable of bonding physically and/or chemically to the white filler, such a bond being established for example between a silicon atom of the coupling agent and the hydroxyl (OH) groups on the surface of the white filler (for example the surface silanols in the case of silica);

X represents a functional unit ("X" function) capable of bonding physically and/or chemically to the elastomer, for example via a sulfur atom;

T represents a hydrocarbon group that connects Y and X.

Coupling agents are not to be confused with covering agents that simply cover the white filler, in particular silica, which in known manner comprise the Y function which is active towards the white filler, but do not have the X function which is active towards the elastomer.

Silica/elastomer coupling agents, in particular, have been described in numerous documents, the best known being bifunctional organosilanes.

Thus, in patent application FR-A-2 094 859 it was proposed to use a mercaptosilane for the manufacture of tire treads. It was then discovered, and is today well known, that the mercaptosilanes, in particular γ-mercaptopropyltrimethoxysilane and γ-mercaptopropyltriethoxysilane, are capable of giving better silica/elastomer coupling properties. However, those coupling agents cannot be used industrially because the high reactivity of their —SH functions very rapidly leads to premature vulcanization during the preparation of the composition in an internal mixer, also known as "scorching", which results in very high Mooney plasticity values and, at the end, compositions which are virtually impossible to work and utilize industrially. FR-A-2 2-6 330 and U.S. Pat. No. 4,002,594 illustrate this result from using such coupling agents bearing —SH functions and the compositions that contain them industrially.

The replacement of these mercaptosilanes by polysulfurized organosilanes has been proposed to overcome these drawbacks (see for example FR-A-2 206 330). Among these compounds, the tetrasulphide of bis-3-triethoxysilylpropyl ("TESPT") is particularly regarded as the product which, for vulcanized rubber compositions filled with silica, provides the best balance in terms of resistance to scorching, ease of working and reinforcing power.

This coupling agent, however, is very costly and has to be used in large amounts, in the order of 2 to 3 times as much as the quantity of γ-mercaptopropyltrimethoxysilane needed to obtain equivalent coupling results.

It was therefore desirable, particularly to reduce the overall cost of the formulations, to be able to industrially prepare rubber compositions reinforced with silica, or more generally with a reinforcing white filler, which contain coupling agents in smaller amounts than those used in the case of the polysulftirized organosilanes. It is also desired that these agents also provide as good a performance as the mercaptosilanes, while avoiding premature scorching and working problems linked to an excessively high viscosity of the compositions.

During the course of research, the Applicant discovered that particular alkoxy and mercapto-alkyl multifunctionalized PODS compounds unexpectedly satisfied all the above requirements.

(Multi)functionalized POS compounds have already been described in diene rubber compositions, in particular ones intended for the manufacture of tires, see, for example, EP-A-0 731 133, EP-A-0 761 748 and WO 96/29364, which describe POS functionalized by polar groups (particularly hydroxyl and/or alkoxy groups) and possibly with organic groups such as long alkyl chains, the (cyclohexen-3-yl)-2-ethylradical or the (methyl-4-cyclohexen-3-yl)-2-propylradical. However, such POS can at best only act simply as covering agents for the silica (Y function), but not as a coupling agent (for lack of any X function). Furthermore, in the compositions described they are always associated with sulfurized organosilanes of the type mentioned earlier.

The use of multifunctionalized POS having both alkoxy and thiol —SH functions as coupling agents (white filler/elastomer) in diene rubber compositions intended for the manufacture of tires is all the more unexpected because the scorching problems known to occur with mercaptosilanes bearing —SH functions as the "X" function would, on the contrary, discourage those the person skilled in the art from using thiol functions in such compositions.

SUMMARY OF THE INVENTION

Consequently, a first object of the invention is to provide sulfur-vulcanizable rubber composition intended for the manufacture of tires, comprising at least one diene elastomer, a white filler as reinforcing filler and a coupling agent (white filler/elastomer) bearing at least two functions Y and X, that on the one hand, can be grafted to the white filler by means of the Y function and, on the other hand, to the elastomer by means of the X function, this composition being characterised in that said coupling agent comprises a multifunctionalized polyorganosiloxane (POS) comprising, per molecule:

a)—a first siloxyl unit bearing, on the silicon atom, at least one straight-chain or branched $C_1$ to $C_{15}$ alkoxy group (i) (the Y function).

b)—a second siloxyl unit bearing, on the silicon atom, at least one radical (2i) having the general formula Z—SH (X function), Z being a straight-chain or branched divalent hydrocarbon binding group. Preferably the Z hydrocarbon group comprises 2 to 30 carbons.

The compositions according to the invention have, in particular, the advantage of offering an advantageous alternative to the use of polysulfurized organosilanes, in particular TESPT, while allowing a substantial reduction in the quantities of coupling agent compared with conventional compositions that contain such organosilanes. The overall cost of the formulation is thus reduced.

A further aspect of the invention is the use of the rubber compositions according to the invention for the manufacture of tires or of rubber articles intended for such tires; said articles being selected from the group consisting of treads, underlayers intended to be positioned beneath these treads, sidewalls, beads, protectors, inner tubes or airtight internal rubbers for tubeless tires.

The subject of the invention is also such tires and rubber articles themselves when they comprise a rubber composition according to the invention.

A still further aspect of the invention is a process to ensure coupling (white filler/elastomer) in diene rubber compositions reinforced with a white filler and intended for the manufacture of tires, said process being characterised in that a POS according to the above definition is incorporated into the said composition by mixing, before the vulcanization thereof.

Finally, a subject of the invention is the use of a POS, as defined above as the coupling agent (white filler/elastomer) in diene rubber compositions reinforced with a white filler and intended for the manufacture of tires.

BRIEF DESCRIPTION OF THE DRAWINGS

The invention can be better understood by references to the attached drawings in which.

DETAILED DESCRIPTION

Figure 1:
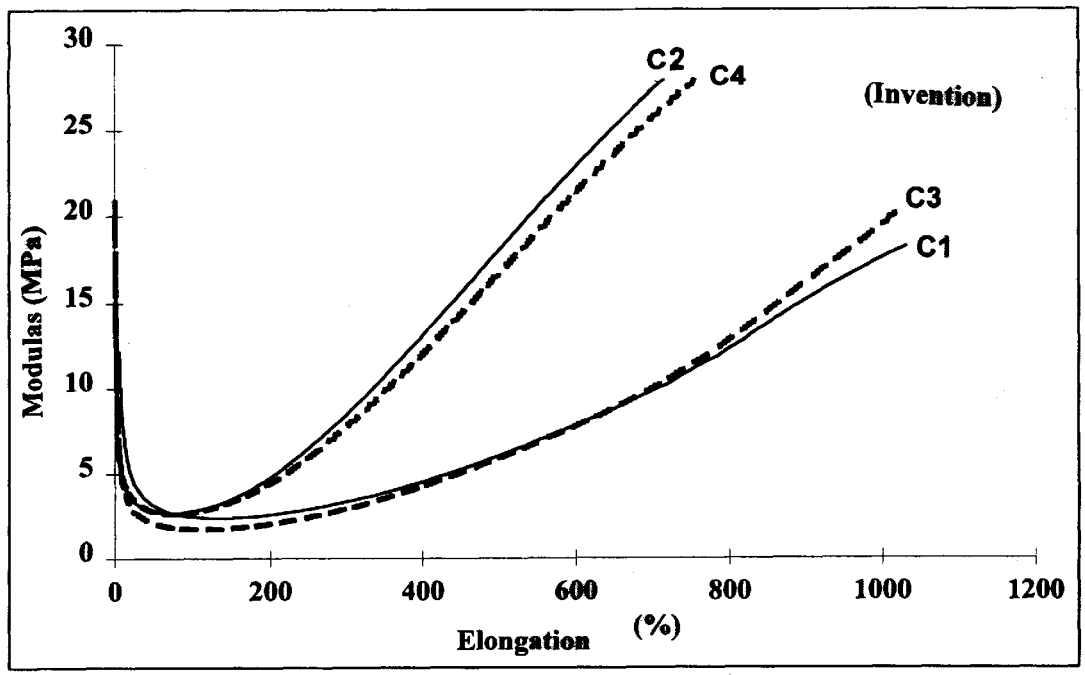
FIG. 1 depicts a curve of the modules variation as a function of diene elastomer compositions denoted $C_1, C_2, C_3,$ and to $C_4$, with $C_4$ being in accordance with the invention.

The invention and its advantages will be readily understood in the light of the description and examples and figures that follow.

I. Measurements and Tests Used

The rubber compositions are characterised before and after curing, as indicated hereafter.

I-1. Mooney Plasticity

An oscillating consistometer is used such as described in standard AFNOR-NF-T-43-005 (November 1980). The Mooney plasticity is measured in accordance with the following principle: the uncured mix is molded in a cylindrical enclosure heated to 100° C. After one minute's preheating, the rotor turns within the test piece at 2 rpm, and the torque used for maintaining this movement is measured after four minutes' rotation. The Mooney plasticity is expressed in "Mooney units" (MU; 1 MU=0.83 newton.meter).

I-2. Scorching Time

The measurements are carried out at 130° C., in accordance with standard AFNOR-NF-T43-005 (November 1980). The evolution of the consistometric index as a function of time makes it possible to determine the scorching time for the rubber compositions, assessed in accordance with the above standard by the parameter T5, expressed in minutes, and defined as being the time necessary to obtain an increase in the value of the consistometric index (expressed in "Mooney units") of 5 units above the minimum value measured for this index.

I-3. Tensile Tests

These tests make it possible to determine the elasticity stresses and the breaking properties; unless indicated otherwise, they are carried out in accordance with the standard AFNOR-NF-T46-002 of September 1988.

The secant moduli at 10% elongation (M10), 100% elongation (M100) and 300% elongation (M300) are measured in a second elongation (i.e. after an accommodation cycle). The breaking stresses and elongations at break are also measured. All these tensile measurements are carried out under normal conditions of temperature and humidity in accordance with the standard AFNOR-NF-T40-101 (December 1979).

Processing the tensile data also makes it possible to trace the curve of the modulus as a function of the elongation (see FIGS. 1 and 2 attached hereto), the modulus used here being the secant modulus measured in a first elongation, and calculated reduced to the real section of the test piece, and not to the initial section, as previously.

I-4. Hysteresis Losses

The hysteresis losses (HL) are measured by rebound at 60° C. at the sixth impact, and are expressed in % in accordance with the following equation:

$$HL(\%) = 100[(W_0 - W_1)/W_0],$$

in which $W_0$=energy supplied; $W_1$=energy restored.

II. Conditions of Carrying Out the Invention

In addition to the various usual additives or those capable of being used in a sulfur-vulcanizable rubber composition intended for the manufacture of tires, the compositions according to the invention comprise, as base constituents, at least one diene elastomer, at least one white filler as a reinforcing filler and at least one coupling agent (white filler/elastomer) comprising an alkoxy and mercapto-alkyl multifunctionalized POS.

II-1. Diene Elastomer

"Diene" elastomer or rubber is understood herein to mean, an elastomer formed at least in part (i.e. a homopolymer or a copolymer) from diene monomers (monomers bearing two double carbon-carbon bonds, whether conjugated or not).

Generally, "essentially unsaturated" diene elastomer is understood here to mean a diene elastomer formed at least in part from conjugated diene monomers having a content of members or units of diene origin (conjugated dienes) which is greater than 15% (mole %).

Thus, for example, such diene elastomers, as butyl rubbers or copolymers of dienes and of alpha-olefins of the EPDM type do not fall within the preceding definition and may, in particular, be described as "essentially saturated" diene elastomers (low or very low content of units of diene origin which is always less than 15%).

Within the category of "essentially unsaturated" diene elastomers, "strongly unsaturated" diene elastomer is understood to mean a diene elastomer having a content of units of diene origin (conjugated dienes) which is greater than 50%.

These definitions being given, the following are by diene elastomers capable of being used in the compositions according to the invention:

(a) any homopolymer obtained by polymerization of a conjugated diene monomer having 4 to 12 carbon atoms;

(b) any copolymer obtained by copolymerization of one or more dienes conjugated together or with one or more aromatic vinyl compounds having 8 to 20 carbon atoms;

(c) a ternary copolymer obtained by copolymerization of ethylene and an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as 1,4-hexadiene, ethylidene norbornene or dicyclopentadiene;

(d) a copolymer of isobutene and isoprene (butyl rubber), and also the halogenated, in particular chlorinated or brominated, versions of this type of copolymer.

Although it applies to all types of diene elastomer, the person skilled in the art of tires will understand that the present invention is used first and foremost with essentially unsaturated diene elastomers, in particular those of type (a) or (b) above.

Suitable conjugated dienes include 1,3-butadiene, 2-methyl-1,3-butadiene, the 2,3-di($C_1$ to $C_5$ alkyl)-1,3-butadienes, such as, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl aromatic compounds are, in particular, styrene, ortho-, meta- and para-methylstyrene, the commercial mixture "vinyl-toluene", para-tertiobutylstyrene, the methoxy-styrenes, the chloro-styrenes, vinyl mesitylene, divinyl benzene and vinyl naphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The polymers may be block, statistical, sequenced or microsequenced polymers, and may be prepared by dispersion or in solution.

Preferred elastomers are polybutadienes, particularly those having a 1,2 linkage content of between 4% and 80%, those having a content of cis-1,4 [bonds] of more than 80%, polyisoprenes, butadiene-styrene copolymers, in particular those having a styrene content of between 5% and 50% by weight, more particularly between 20% and 40% by weight, wherein the butadiene part has a 1,2-bond content of between 4% and 65% and a trans-1,4 bond content of between 20% and 80%, butadiene-styrene copolymers, in particular those having an isoprene content of between 5% and 90% by weight and a glass transition temperature (Tg) of between −40° C. and −80° C., and isoprene-styrene copolymers, in particular those having a styrene content of between 5% and 50% by weight and a Tg of between −25° C. and −50° C.

Suitable butadiene-styrene-isoprene copolymers include those having a styrene content of between 5% and 50% by weight more particularly between 10% and 40%, an isoprene content of between 15% and 60% by weight, more particularly between 20% and 50%, a butadiene content of between 5% and 50% by weight, more particularly between 20% and 40%, wherein the butadiene part has a 1,2 bond of between 4% and 85%, and a trans-1,4 bond content of between 6% and 80%, and the isoprene part has a 1,2- plus 3,4 bond content of between 5% and 70%, of trans-1,4 bond content of between 10% and 50%, and more generally any butadiene-styrene-isoprene copolymer having a Tg of between −20° C. and −70° C.

The elastomer may be coupled and/or starred or alternatively functionalized with a coupling and/or starring or functionalizing agent. The elastomer may also be natural rubber or a blend based on natural rubber with any synthetic elastomer, in particular a diene one.

Preferably, the diene elastomer of the composition according to the invention is selected from among strongly unsaturated diene elastomers which includes of the polybutadienes, the polyisoprenes or natural rubber, butadiene-styrene copolymers, butadiene-isoprene copolymers, isoprene-styrene copolymers, butadiene-styrene-isoprene copolymers, or a mixture of two or more of these compounds.

When the composition according to the invention is intended for a tire tread, the diene elastomer is preferably a butadiene-styrene copolymer prepared in solution having a styrene content of between 20% and 30% by weight, a content of vinyl bonds of the butadiene part of between 15% and 65%, a content of trans-1,4 bonds of between 20% and 75%, and a glass transition temperature of between −20° C. and −55° C. This butadiene-styrene copolymer may also be used in a mixture with a polybutadiene having preferably more than 90% cis-1,4 bonds.

II-2. Reinforcing Filler

The white filler used as reinforcing filler may constitute all or only part of the total reinforcing filler, in the latter case associated, for example, with carbon black.

Preferably, in the compositions according to the invention, the reinforcing white filler constitutes the majority, i.e. more than 50% by weight, of the total reinforcing filler, more preferably more than 80% by weight of this total reinforcing filler.

In the present application, "reinforcing" white filler is to be understood to mean a white filler capable of reinforcing alone, without any means other than an intermediate coupling agent, a rubber composition intended for the manufacture of tires. In other words the reinforcing white filler is capable of replacing a conventional carbon black filler in its reinforcing function.

Preferably, the reinforcing white filler is silica ($SiO_2$) or alumina ($Al_2O_3$), or a mixture of these two fillers.

The silica used may be any reinforcing silica known to the person skilled in the art, in particular any precipitated or pyrogenic silica having a BET surface area and a specific CTAB surface area both of which are less than 450 $m^2/g$. The highly dispersible precipitated silicas are preferred, in particular when the invention is used to manufacture tires having a low rolling resistance. "Highly dispersible silica" is understood to mean any silica having a very substantial ability to disagglomerate and to disperse in a polymer matrix, which can be observed in known manner by electron or optical microscopy on thin sections. Non-limiting examples of such preferred highly dispersible silicas, include the silica Perkasil KS 430 from Akzo, the silica BV 3380 from Degussa, the silicas Zeosil 1165 MP and 1115 MP from Rhône-Poulenc, the silica Hi-Sil 2000 from PPG, the silicas Zeopol 8741 or 8745 from Huber, and treated precipitated silicas such as, for example, the aluminium-"doped" silicas described in application EP-A-0 735 088.

Preferably, the reinforcing alumina is a highly dispersible alumina having a BET surface area from 30 to 400 $m^2/g$, more preferably 80 to 250 $m^2/g$, an average particle size of at most 500 nm, more preferably at most 200 nm, a high amount of reactive Al—OH surface functions, as described in application EP-A-0 810 258 referred to above. Non-limitative examples of such reinforcing aluminas are in particular the aluminas A125, CR125 and D65CR of Baïkowski.

The physical state in which the reinforcing white filler is present is immaterial, whether it be in the form of a powder, microbeads, granules or balls. The "reinforcing white filler" is also understood to mean mixtures of different reinforcing white fillers, in particular highly dispersible silicas and/or aluminas such as described above.

The reinforcing white filler may also be used in a blend (mixture) with carbon black. Suitable carbon blacks are all the carbon blacks, in particular carbon blacks of the type HAF, ISAF or conventionally used in tires and, particularly, in treads for tires. Non-limiting examples of such blacks, include the blacks N115, N134, N234, N339, N347 and N375. The quantity of carbon black present in the total reinforcing filler may vary within wide limits, this quantity preferably being less than the quantity of reinforcing white filler present in the composition.

Preferably, the amount of total reinforcing filler (reinforcing white filler plus carbon black if applicable) lies in a range from 30 to 150 phr (parts by weight to one hundred parts of elastomer (or rubber)), the optimum differing according to the intended applications, because the level of reinforcement expected for a bicycle tire, for example, is in known manner distinctly than that required for a tire for a passenger vehicle or for a utility vehicle such as a heavy-goods vehicle.

II-3. Coupling Agent

The coupling agent used in the compositions according to the invention is an alkoxy and mercapto-alkyl multifunctionalized POS, comprising per molecule:

a) a first siloxyl unit bearing, on the silicon atom, at least one $C_1$ to $C_{15}$ straight-chain or branched alkoxy radical termed radical (i) (Y function); and b) a second siloxyl unit bearing, on the silicon atom, at least one radical termed radical (2i) of general formula Z—SH (X function), Z being a straight-chain or branched divalent hydrocarbon binding group preferably containing 2 to 30 carbons.

These POS are, therefore, branched, straight-chain or cyclic, statistical, sequenced or blocked copolymers, comprising at least the two functions X and Y previously defined on the polysiloxane chain, be it along the chain or at the end(s) of the chain.

According to a particular embodiment of the invention, the POS further comprises a third functionalized siloxyl unit bearing on the silicon atom at least one radical (3i) (function marked W) comprising an ethylenically unsaturated $C_2$ to $C_{20}$ hydrocarbon chain from which the X function is derived by a sulfurization reaction, said unsaturated chain being linked to the silicon atom by an Si—C bond.

Radical (i) is more preferably a $C_1$–$C_6$ alkoxy, in particular methoxy, ethoxy and (iso)propoxy.

The radical (2i) is more preferably selected from among the radicals Z—SH in which Z is a straight-chain or branched $C_2$–$C_{10}$-alkylene group, optionally comprising an atom of oxygen, or an alkylene-cycloalkylene group, the alkylene part of which has the same definition as above, and the cyclic part of which comprises 5 to 12 carbon atoms, which optionally substituted by one or two $C_1$–$C_3$ alkyl groups. Radicals meeting this definition have been described, in particular, in application WO 96/16125 referred to above, with thiol functions of primary, secondary or tertiary nature.

As multifunctionalized POS which can be used in the compositions of the invention, there may be selected in particular a POS comprising, per molecule (i, j, k, p, q, r being integers):

a) a first functional siloxyl unit of the formula:

  (I)

in which:
  i=0, 1 or 2; p=1, 2 or 3; with the proviso that (i+p)=1, 2 or 3;
  R is a monovalent hydrocarbon radical selected from among straight-chain or branched $C_1$–$C_6$ alkyls, in particular methyl, ethyl, propyl, butyl, and/or aryls, particularly phenyl, the radicals R being identical or different when i=2;
  Y is a radical (i) as defined above, the radicals Y being identical or different when p=2 or 3;

b) a second functional siloxyl unit of the formula:

  (II)

in which:
  j=0, 1 or 2; q=1, 2 or 3; with the proviso that (j+q)=1, 2 or 3;
  R has the same definition as given above for the substituent R of the unit (i) above, and may be identical to or different from the latter;
  X is a radical (2i) as defined above, the radicals X being identical or different when q=2 or 3;

c) and optionally a third functional siloxyl unit, a precursor of the preceding unit (II), of the formula:

  (III)

in which:
  k=0, 1 or 2; r=1, 2 or 3; with the proviso that (k+r) 1, 2 or 3;
  R has the same definition as for the substituent R of the unit (II);
  W is a radical (3i) as defined above, the radicals W being identical or different when r=2 or 3.

The simplified notation used in formulae (I) to (III) above is well-known to the person skilled in the art in the field of polyorganosiloxanes; it covers the different particular formulae possible for the siloxyl units, regardless of their amount of functionalization, their position on the polysiloxane chain (along the chain or at the end(s) of the chain) or the nature of the POS (for example, straight-chain, branched or cyclic).

POS which satisfy the above definition and bear the functions Y, X and possibly W, have been described, in particular, in application WO 96/16125 mentioned above.

According to a more preferred embodiment, the invention is implemented starting from straight-chain POS of partial formula (IV) incorporating along the polysiloxane chain at least the following units in the following proportions (i, j, k, p, q, r are then all equal to 1 with regard to the siloxyl units located along the polysiloxane chain):

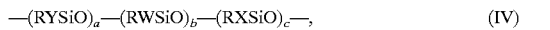  (IV)

R, Y, W and X, which may be identical or different, having the meanings given above, and the numbers a, b and c (integers or fractions) satisfying the following conditions: a=1 to 150; b=0 to 85; c=1 to 100; a+b+c=2 to 300.

It will readily be understood that when the POS of partial formula (IV) above does not contain any other unit than the three above along the polysiloxane chain, it then satisfies the general formula (IV-1):

  (IV-1)

in which the end groups A and B, which may or may not bear functions Y, X or W, are selected from among the following groups:
  for A: $(R_{i'}Y_{p'}SiO—)$ and/or $(R_{j'}X_{q'}SiO—)$ and/or $(R_{k'}W_{r'}SiO—)$;
  for B: $(—SiR_{i'}Y_{p'})$ and/or $(—SiR_{j'}X_{q'})$ and/or $(—SiR_{k'}W_{r'})$,
with:
  i'=0, 1, 2 or 3; p'=0, 1, 2 or 3; and the proviso that (i'+p')=3;
  j'=0, 1, 2 or 3; q'=0, 1, 2 or 3; and the proviso that (j'+q')=3;
  k'=0, 1, 2 or 3; r'=0, 1, 2 or 3; and the proviso that (k'+r')=3;
  R, Y, W and X, which may be identical or different, respectively, when present in A and/or B, and a, b and c, having the meanings given above.

By way of example, when the polysiloxane chain has no Y, X or W functionality at the end(s) of the chain, the POS of general formula (IV-1) above then has as the particular formula (IV-2);

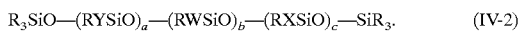  (IV-2)

When the polysiloxane chain comprises for example a (single) Y function at each end of the chain, the POS of general formula (IV-1) above then has as the particular formula (IV-3):

  (IV-3)

More preferably, in formulae I to IV-3 above, R is methyl or ethyl, Y is methoxy or ethoxy, W is selected from among the radicals (3i-1) and (3i-2) indicated below, the corresponding radical X which derives therefrom being referenced (2i-1) or (2i-2) below:

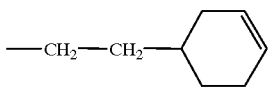  (3i-1)

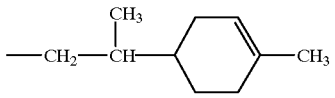  (3i-2)

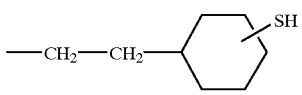  (2i-1)

(2i-2)

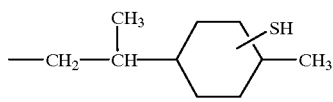

The invention is most preferably used with a straight-chain POS of the general formula (IV) above, and in particular of formulae IV-1, IV-2 or IV-3, in which:

R=methyl;

Y(radical i)=ethoxy (OEt);

W(radical 3i)=ethylene-cyclohexenyl(i.e. radical 3i-1);

X(radical 2i)=Z—SH with Z=ethylene-cyclohexylene(i.e. radical 2i-1);

a=1 to 50, more preferably 1 to 40;

b=0 to 30, more preferably 0 to 20;

c=1 to 40, more preferably 1 to 25;

a+b+c=10 to 100, more preferably 10 to 70.

When the polysiloxane chain contains no siloxyl unit other than the units (I), (II) and (III) indicated above, that is to say, no function other than the functions Y, X or W (such as, in particular, a fourth function which may be derived, for example, by a secondary sulfurization reaction of one of the X or W functions), the person skilled in the art will readily understand that such a preferred POS then has as the developed formula (IV-4):

(IV-4)

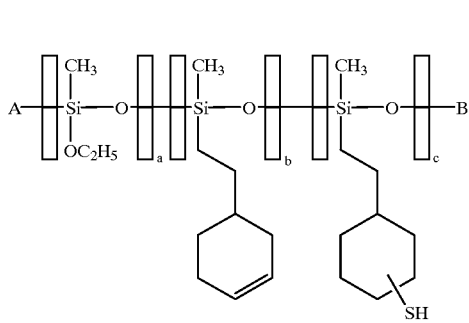

in which formula the end groups A and B are as defined above, with the following meaning for R, Y, W and X if they are present at least once in (A) and/or (B):

R=methyl;

Y=OEt;

W=radical (3i-1);

X=radical (2i-1).

In particular, when the POS of formula (IV-4) above comprises at the chain end groups (A) and (B) bearing exclusively methyl groups, its formula then becomes (IV-5):

(IV-5)

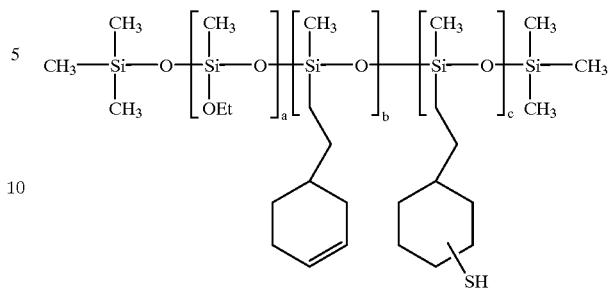

The POS of general formula (IV) which bear secondary thiol functions, and in particular those of the particular formulae (IV-4) and (IV-5) above which bear radicals 2i-1, have demonstrated very good reactivity with respect to the diene elastomers used in tire compositions.

They may be prepared by a sulfurization reaction with hydrogen sulphide ($H_2S$) on intermediate POS bearing corresponding Y and W functions, these intermediate POS being referred to hereafter as "precursor POS".

The precursor POS may be prepared in accordance with the process described in application WO 96/16125 referred to above, which essentially consists of:

a) firstly reacting a polymethylhydrogenosiloxane (PMHS) bearing hydrogen functions with at least one alcohol (for example ethanol) from which the alkoxy function Y is derived, which can be used as a reactant and as a reaction solvent, in the presence of a suitable catalyst (in particular Karstedt platinum catalyst), in accordance with a dehydrogeno-condensation mechanism using a fraction of the ≡SiH groups available at the start; and b) implementing the addition of the POS thus obtained by dehydrogeno-condensation on at least one compound comprising at least two ethylenic unsaturations from which the unsaturated function W derives, in accordance with a hydrosilylation mechanism performed using the remaining ≡SiH groups.

The final POS, i.e., the alkoxy and mercapto-alkyl functionalized POS, are then prepared by a sulfurization reaction of the precursor POS, by reacting $H_2S$ on these precursor POS. From a practical point of view, the process is performed in a closed, standard reactor, which makes it possible to bring liquid and gas into contact with a possibly heterogenous catalyst, optionally operating under pressure. The pressure is not a critical parameter, but it is advantageous to operate at a pressure of at least 0.1 MPa and, preferably, within the range from 0.5 to 2 MPa, more preferably still from 0.7 to 1.4 MPa. The conditions of the $H_2S$ supply are determined so as to have a molar excess of $H_2S$ of at least 5% relative to the ethylenic unsaturation of the W function borne by the precursor POS. The reaction temperature preferably lies in the range from 50° C. to 120° C.

Suitable catalysts for use are the radical initiator compounds for example, azo-organic compounds, organic peroxides, organic percarbonates, used alone or in association with promoters such as, for example, nickel and/or trivalent phosphorus compounds (see, for example, FR-A-2 048 451). Preferably, at least one free-radical initiator compound belonging to the family of azo-organic compounds and organic peroxides is used as catalyst, more preferably at least one radical initiator compound belonging to the family of azo-organic compounds, such as 2,2'-azobis(2,4-dimethyl)pentane-nitrile, 2,2'-azobis-(isobutyronitrile), 2-(tert.-butylazo)-2,4-dimethylpentanenitrile, 2-(tert.-butylazo)isobutyronitrile), 2-(tert.-butylazo)-2-methylbutane-nitrile or 1,1-azobis-cyclohexanecarbonitrile. The most particularly preferred catalyst is 2,2'-azobis-(isobutyronitrile) (abbreviated AIBN). For the majority of reactions, the quantity of catalyst, expressed in percent by weight of catalyst relative to the precursor POS, lies within the range from 0.1 to 10% and preferably from 0.5 to 4%.

The reactions between $H_2S$ and the precursor POS may be carried out in bulk in a heterogenous medium and without solvent. Preferably, they are carried out in a homogenous medium by addition of a solvent or a mixture of solvents common to the precursor POS and to the catalyst. The preferred solvents are of the non-polar aprotic type, such as chlorobenzene, toluene, xylene, hexane, cyclohexane, octane or decane. Toluene and xylene are particularly preferred. The duration of the reactions is not critical; it may be, for example, between 1 and 4 hours for temperatures of the order of 70 to 90° C.

The process may be carried out batchwise or continuously, using any known operating method. One operating method which is highly suitable is as follows: in a first stage, the reactor is fed with solvent and the precursor POS, then it is connected continuously to the $H_2S$ source to saturate the reaction medium with the gas; and in a second stage, the catalyst solution is then introduced into the reactor. However, it is also possible, according to another operating method, not to introduce the precursor POS until the second stage, at the same time as the catalyst solution.

The multifunctionalized POS previously described, bearing alkoxy and thiol functions, have proved sufficiently effective on their own and may advantageously constitute the sole coupling agent present in the compositions according to the invention.

The person skilled in the art will be able to adjust the POS coupling agent content in the compositions of the invention according to the intended application, the nature of the polymer used and the quantity of reinforcing white filler used.

This content of POS coupling agent will generally lie within a range of 0.5 to 12% (% by weight relative to the weight of the reinforcing white filler), more preferably within a range from 2 to 10%.

Below the minimum amounts indicated above, the effect is insufficient, whereas beyond the maximum amounts indicated above no further improvement in the coupling is observed, while the costs of the formulation continue to increase.

II-4. Various Additives

Of course, the compositions according to the invention contain, in addition to the compounds already described, all or part of the constituents usually used in diene rubber mixes intended for the manufacture of tires, such as plasticizers, pigments, antioxidants, antiozonants, a cross-linking system based either on sulfur or on sulfur donors and/or peroxide and/or bismaleimide, vulcanization accelerators, extender oils, etc. A conventional white filler which is slightly reinforcing or non-reinforcing, may also be associated, if need be, with the reinforcing white filler, for example clays, bentonite, talc, chalk, kaolin or titanium oxide.

In addition to the multifunctionalized POS, the compositions according to the invention may further comprise agents for covering the reinforcing white filler, such as, for example, alkoxysilanes, polyols, polyethers (for example polyethylene glycols), amines, hydroxylated POS such as, for example, α,Ω-dihydroxypolydiorganosiloxanes (in particular dihydroxypolydimethylsiloxanes), or alternatively hydrolysable POS, bearing for example the single Y alkoxy function. The compositions according to the invention may also contain other coupling agents.

II-5. Preparation of the Compositions

The rubber compositions are prepared by processing the diene polymers according to entirely known techniques, by thermomechanical working in one or two stages in a internal paddle mixer followed by mixing on an external mixer.

According to the conventional one-stage process, all the necessary constituents, with the exception of the vulcanization system, are introduced into an internal mixer. The result of this first mixing stage is then taken up in an external mixer, generally an open mill, and then the vulcanization system is added thereto. A second stage may be added in the internal mixer, essentially with the aim of making the mixture undergo complementary heat treatment.

III. EXAMPLES OF EMBODIMENT OF THE INVENTION

III-1. Synthesis of the POS

The alkoxy and mercapto-alkyl multifunctionalized POS used in the examples of embodiment presented below are straight-chain POS having the above formula (IV) in which:

R=methyl;

Y(radical i)=ethoxy (OEt)

W(radical 3i)=ethylene-cyclohexenyl(i.e. radical 3i-1)

X(radical 2i)=Z—SH with Z=ethylene-cyclohexylene (i.e. radical 2i-1).

These POS are synthesised in three stages (ethoxylation, hydrosilylation and then sulfurization) from known PMHS, such as those described for example in WO 96/16125, using a batch process or a continuous process.

III-1-A). Batch synthesis—POS Nos. 1, 2 and 3 a) Stage 1: Preparation of a POS with ≡Si—OC$_2$H$_5$ (Y function) and ≡SiH Functional Units The procedure is as follows: into a 5-liter reactor equipped with a stirrer system and the internal volume of which is kept under an atmosphere of dry nitrogen are introduced 3 liters of absolute ethanol and 1.081 g of a solution in divinyltetramethyldisiloxaneof a platinum complex with 13.6% by weight of platinum metal liganded by divinyltetramethyldisiloxane (Karstedt catalyst). The mixture is stirred and, over a period of 6 hours 15 minutes, 1 kg of a PMHS oil with trimethylsilyl ends containing 1584 milli-equivalents(meq) of ≡SiH units per 100 g of the oil is run in progressively. During the progressive addition of the PMHS oil, the temperature of the reaction mass is kept at 65° C. Hydrogen evolution is observed. The excess ethanol is eliminated with the aid of a rotary evaporator.

This gives 1566 g of a clear silicone oil corresponding to the following average formula, as confirmed by nuclear magnetic resonance (NMR) analysis of the silicon (with a=35; b=17):

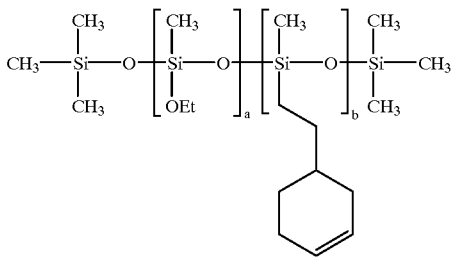

b) Stage 2: preparation of a precursor POS with the functional units ≡Si—OC$_2$H$_5$ (Y function) and ≡Si—(CH$_2$)$_2$-cyclohexenyl (W function)

The procedure is as follows: into a 2-liter reactor equipped with a stirrer system and the internal volume of which is kept under an atmosphere of dry nitrogen, are introduced 295.4 g of a solution of 4-vinyl-1-cyclohexene and 0.3434 g of the Karstedt catalyst solution. The mixture is stirred and the temperature of the reaction medium brought to 90° C. Over a period of 7 hours, 618.5 g of the silicone oil obtained at the end of stage 1 above are then gradually run in. At the end of this addition, it is noted that the transformation of all the ≡SiH functional units has been completed. The reaction mixture is then devolatilized by heating to 80° C. under a reduced pressure of 1.33×10$^2$ Pa for 30 min.

This gives 754 g of a clear silicone oil with a viscosity of 300 MPa.s corresponding to the following average formula, as confirmed by NMR analysis (with a=35; b=17):

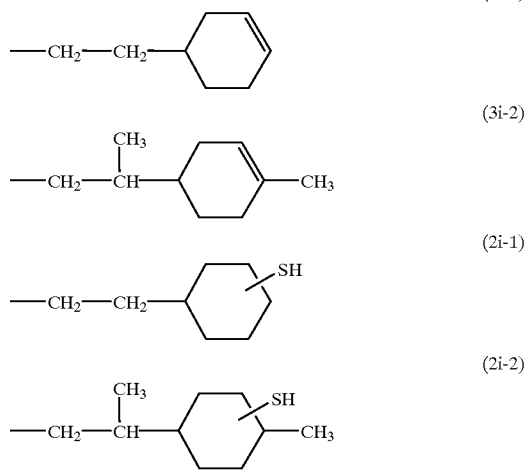

The above precursor POS comprising the functions Y and W will be referred to hereinafter as POS No. 1.

c) Stage 3: preparation of a final POS (POS No. 2 and No. 3) with the functional units ≡SiO—C$_2$H$_5$ (Y function) and ≡Si-(ethylene-cyclohexylene)-SH(X function)

The procedure in this last stage is as follows: into a 2-liter stainless steel reactor equipped with a stirrer system and with a H$_2$S gas supply system, and whose internal volume is kept under a dry nitrogen atmosphere, are introduced V1 g of dry toluene, followed by M1 g of the silicone oil obtained at the end of Stage 2 above (the precursor POS). The internal volume of the reactor containing these is then flushed with H$_2$S. The mixture is stirred and the temperature of the reaction medium is brought to T1° C. under a H$_2$S pressure equal to P1 expressed in MPa. Over a period of t1 min, a catalyst solution based on M2 g of AIBN and V2 g of dry toluene is gradually run in. When the addition has been completed, the reaction mixture is left to react for t2 min at the temperature T1° C., with stirring. At the end of the period t2 the equipment is purged with a stream of nitrogen and the solvent is then evaporated in a rotary evaporator, with heating to around 80–100° C. under a reduced pressure of about 7×10$^2$ Pa for 1 hour 30 minutes.

This gives M3 g of a slightly yellow silicone oil, which is analysed by NMR. The NMR analysis reveals that depending on the particular conditions under which Stage 3) is carried out, a minority fraction of the X or W functions, during this last stage, may undergo a secondary sulfurization reaction with the creation of monosulfur or polysulfur bridges between adjacent ethylene-cyclohexylene-SH or ethylene-cyclohexenyl sites belonging to one and the same polysiloxane chain or to neighbouring polysiloxane chains.

Two examples of POS (POS No. 2 and POS No. 3) are prepared under the following specific conditions:
  POS No. 2: V1=530 g; M1=70.4 g; T1=70° C.; P1=0.85 MPa; t1=65 min; M2=0.72 g; V2=24.4 g; t2=115 min; M3=62 g;
  POS No. 3: V1=415 g; M1=140.1 g; T1=70° C.; P1=1.3 MPa; t1=60 min; M2=4.21 g; V2=210.8 g; t2=120min; M3=120 g.

POS No. 2 prepared as above corresponds to the average formula (IV-5) above, in which: a=35; b=9.7; c=7.3; b+c=17, i.e. on average 43% of the 17 W functions of the precursor (POS No. 1) have been transformed into the ≡Si-(ethylene-cyclohexylene)-SH function (X functions) while the remaining 57% are unreacted W functions.

POS No. 3, which conforms to formula IV, is identical to POS No. 2 except for the following differences: a=35; b=2.7; c=12.8; b+c=15.5, i.e. on average 75% of the 17 W functions of the precursor (POS No. 1) have been transformed to ≡Si-(ethylene-cyclohexylene)-SH functions (X functions) while 16% of the initial W functions have not reacted. In this case NMR analysis reveals that the remaining 9% correspond to X or W functions which have undergone a secondary sulfurization reaction with the creation of monosulfur or disulfur bridges (S$_1$ or S$_2$ bridges) between adjacent ethylene-cyclohexylene-SH or ethylene-cyclohexenyl sites belonging to one and the same polysiloxane chain or to neighbouring polysiloxane chains.

III-1-B). Continuous synthesis—POS No. 4 a) Stage 1: Preparation of a POS with ≡Si—OC$_2$H$_5$ (Y function) and ≡SiH Functional Units The procedure, using a continuously operating industrial reactor equipped with a stirrer system, the internal volume of which is kept under a dry nitrogen atmosphere, is as follows:

The PMHS oil with trimethylsilyl ends comprising 1584 milli-equivalents (meq) of ≡SiH units per 100 g of oil is introduced into the reactor at a flow rate of 5.3 kg/h at 47° C. The Karstedt catalyst (platinum liganded with divinyltetramethyldisiloxane, in solution in divinyltetramethyldisiloxane at a concentration of 10% by weight of platinum metal) is dissolved in ethanol to give a final concentration of 20 ppm (parts per million) of platinum metal. The solution so prepared is introduced into the reactor at 50° C. and at a flow rate of 4.5 kg/h. Thus, the reaction takes place at the reflux temperature of the reaction medium, the temperature of the reaction mass then being around 72° C. The gas formed (around 1.08 m$^3$/h) is drawn off and recovered, eliminating the hydrogen which it contains and recycling the alcohol by condensation.

This gives a clear silicone oil having ≡SiH units and ≡Si—OC$_2$H$_5$ units (Y function). During this preparation stage in the industrial reactor, it has been found that the siloxane chains can undergo splitting leading to shorter chains that are mono-ethoxylated or diethoxylated at their chain end(s).

b) Stage 2: Preparation of a Precursor POS having ≡Si—OC$_2$H$_5$ (Y function) and ≡Si—(CH$_2$)$_2$-cyclohexenyl (W function) Functional Units The above POS with ≡SiH and ≡SiOC$_2$H$_5$ units is transferred to a second reactor operating in "batch" mode, where it is subjected to hydrosilylation in order to transform the residual ≡SiH units to ≡Si—C$_2$H$_4$-cyclohexenyl functions (W functions). The consumption of vinylcyclohexene is 51.3 kg per 10 h of operation and the temperature inside the reactor is 70° C. The volatilized ethanol and vinylcyclohexene are condensed and recycled.

This gives a clear silicone oil whose formula, determined by NMR of the silicon, is as follows:

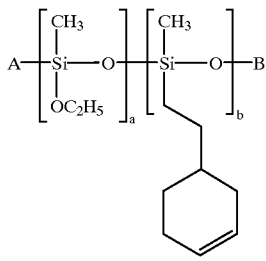

where:
a = 18 ± 2 and b = 10 ± 2;
A and B (molar %):

| | | |
|---|---|---|
| (CH$_3$)$_3$SiO— and/or —Si(CH$_3$)$_3$ | 59%; |
| (C$_2$H$_5$O)(CH$_3$)$_2$SiO— and/or —Si(C$_2$H$_5$O)(CH$_3$)$_2$ | 20%; |
| (C$_2$H$_5$O)$_2$(CH$_3$)SiO— and/or —Si(C$_2$H$_5$O)$_2$(CH$_3$) | 21%. | c) Stage 3: Preparation of a final POS (POS No. 4) having the Functional Units ≡Si—OC$_2$H$_5$ (Y function) and ≡Si-(ethylene-cyclohexylene)-SH(X function)

The procedure in this last stage is as indicated earlier for POS No. 2 and No. 3, but according to the following specific conditions: V1 ≡530 g; M1=70.4 g; T1=70° C.; P1=0.85 MPa; t1=65 min; M2=0.72 g; V2=24.4 g; t2=115 min; M3=62 g.

NMR analysis shows that this POS No. 4 corresponds to the formula (IV-4) above, with (A and B unchanged):

a=18; b=5.5; c=4.5; b+c=10, i.e. on average 45% of the 10 W functions of the precursor POS have been transformed into the function=Si-(ethylene-cyclohexylene)-SH(X functions) while 55% of the initial W functions have not reacted.

III-2. Preparation of the Compositions and Tests

The procedure adopted for the tests described below is as follows: the diene elastomer or mixture of diene elastomers is introduced into an internal mixer filled to 70%, the temperature of which is approximately 60° C., and after an appropriate kneading time, for example about 1 min, all the other ingredients are added, except for the vulcanization system. The mixture is then subjected to thermomechanical working in two stages, respectively lasting about 5 and 4 min, at an average paddle speed of 45 rpm until a maximum dropping temperature of 160° C. has been reached. The mixture so obtained is recovered and the vulcanization system is then added in an external mixer (homo-finisher)at 30° C. Vulcanization is carried out at 150° C.

A) Test 1

In the test described below 4 rubber compositions (SBR/BR blend) based on silica and intended for the manufacture of tire or treads are compared. The SBR elastomer (a styrene-butadiene copolymer) is prepared in solution and contains 26.5% styrene, 59.5% 1–2-polybutadiene units and 23% polybutadiene 1–4 trans units. The BR elastomer (polybutadiene) has over 90% of cis-1,4 bonds (approximately 93%).

These four compositions are identical except for the following differences:
composition No. 1: no coupling agent;
composition No. 2: TESPT (Si69 manufactured by Degussa);
composition No. 3: POS No. 1
composition No. 4: POS No. 2.

Only composition No. 4 is in accordance with the invention. Composition No. 1 is the test control, while composition No. 2 represents the reference composition of the prior art. Tables 1 and 2 show, in succession, the formulations of the various compositions (Table 1—contents of the various products expressed as phr), and their properties before and after curing (150° C., 40 min). It should be noted in that the content of the coupling agent (Si69) in composition No. 2 is 60% greater than that of the coupling agent (POS No. 2) in composition No. 4.

FIG. 1, shows the modulus curves (in MPa) as a function of elongation (in %): the curves are indexed C1 to C4 and correspond respectively to compositions No. 1 to No. 4.

A study of these various results leads to the following observations:

the processing of the uncured compositions containing the coupling agent Si69 or POS is facilitated by a Mooney viscosity which is appreciably lower, indicating that the silica has been covered effectively;

no scorching problem (i.e. premature vulcanization) is apparent with composition No. 4 (T5 higher than 30 as with the coupling agent Si69), despite the presence of the thiol functions in POS No. 2;

moreover, and also quite unexpectedly, the silica/elastomer coupling level illustrated by the M300/M100 ratio (which, for the person skilled in the art, is a good index of the level of reinforcement), appears to be as good with POS No. 2 as it is with the reference coupling agent (Si69), despite the considerably smaller content of POS;

as expected, POS No. 1, which bears Y functions, acts as no more than a covering agent for the silica (the raw viscosity, the M10 modulus, is reduced, but the M300/M100 ratio is hardly changed compared with composition No. 1);

the hysteresis and breaking properties of compositions No. 2 (Si69) and No. 4 (POS 2) are equivalent;

FIG. 1 confirms the above observations: composition No. 4 according to the invention (POS No. 2 and curve C4) shows a performance very similar to that of composition No. 2 (Si69 and curve C2), whereas composition No.3 (POS No. 1 and curve C3) shows no improvement at all other than the effect of the covering observed at low elongation, compared with the control composition (Curve C 1) containing no coupling or coating agent.

Despite a much lower coupling agent content, the composition according to the invention therefore unexpectedly gives a performance equivalent to that of the reference composition containing the conventional TESPT coupling agent.

In addition, supplementary tests have shown that the replacement of POS No. 2 by POS No. 3 in compositions formulated as above, leads to coupling performances essentially identical to those given by POS No. 2.

B) Test 2

In this second test, three natural rubber compositions based on precipitated silica and containing a low proportion of coupling agent (3.2 phr) are compared. These three compositions are identical save for the following differences:

compositionNo. 5: conventional coupling agent Si69;
compositionNo. 6: POS No. 1;
compositionNo. 7: POS No. 2.

Thus, only composition No. 7 is in accordance with the invention. Tables 3 and 4 show, in succession, the formulation of the various compositions and then their properties before and after curing (150° C., 25 min). For its part, FIG. 2 reproduces the modulus curves (in MPa) as a function of elongation (in %), the curves indexed C5 to C7 corresponding respectively to compositions No. 5 to No. 7.

Figure 2:
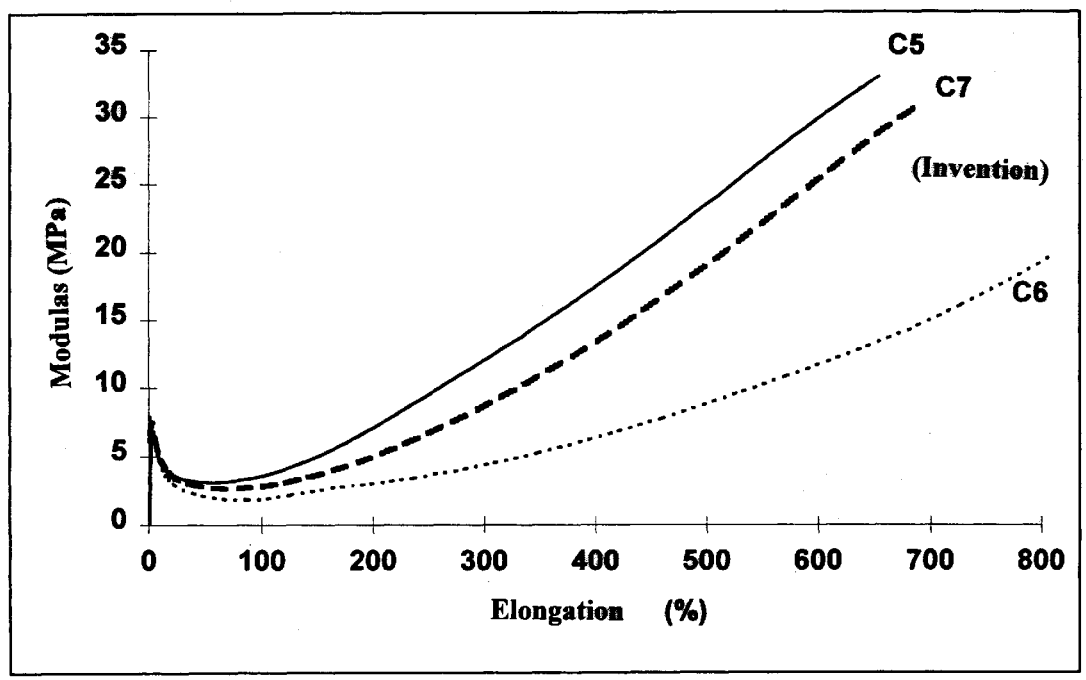
FIG. 2 depicts a curve of the modulus variation of diene elastomer compositions $C_5, C_6,$ and to $C_7$, with $C_7$ being in accordance with the invention.

On examination of the various results, it is clearly apparent that POS No. 2 gives performances close or equivalent to those given by the conventional coupling agent; see, in particular, FIG. 2, curves C5 and C7, whereas POS No. 1 (curve C6) shows a very clearly inadequate performance.

C) Test 3

The test described below compares two compositions of diene rubber reinforced with a white filler (highly dispersible silica) blended with carbon black, intended for the manufacture of tires or treads for these tires. The SBIR elastomer (a styrene-butadiene-isoprenecopolymer) is a commercial elastomer containing 36% styrene units, 20% butadiene units and 44% isoprene units.

The two compositions are identical except for the following differences:

composition No. 8 (control): no coupling agent
composition No. 9 (according to the invention): POS No. 4 of formula (IV-4).

Tables 5 and 6 show respectively the formulation of the various compositions (Table 5: contents of the various products expressed in phr) and their properties before and after curing at 150° C. In this case the properties after curing are determined at the "optimum curing" point (i.e. at T99), determined in known manner in accordance with standard AFNOR-NF-T43-015 of August 1975, where T99 corresponds to the duration needed to obtain 99% of the maximum coupling difference between the minimum coupling before curing and the maximum coupling after curing, at the curing temperature (150° C. in the present case).

A study of these various results leads to the following observations:

the processing of the uncured composition containing the coupling agent (POS) is greatly facilitated compared to the control composition, by virtue of a much lower Mooney viscosity (37 MU instead of 62 MU), indicating that the white filler has been covered effectively;

although curing is more rapid in the presence of the POS, there is no scorching (i.e. premature vulcanization) problem with composition No. 9 (T5 longer than 10 min) despite the presence of thiol functions in the POS;

the coupling level (silica/elastomer), illustrated by the ratio M300/M100, is much better in the presence of POS (by more than one-third);

the hysteresis and breaking stress properties are improved.

D) Test 4

In this test two compositions of diene rubber (SBR elastomer) reinforced with a highly dispersible alumina are compared.

The two compositions are identical save for the following differences:

composition No. 10 (control): no coupling agent;
composition No. 11 (according to the invention): POS No. 4 of formula (IV4).

Tables 7 and 8 show, in succession, the formulation of the various compositions and then their properties before and after curing (150° C., 40 min). The composition according to the invention shows improvements of the same type as those found in Test 3 above, namely:

processing in the uncured state improved with the POS coupling agent (Mooney viscosity 47 MU instead of 64 MU);

no scorching problem with the POS (T5 of 15 min);

ratio M300/M100 almost double that of the control;

improved hysteresis and breaking stress properties.

In conclusion, in a way that could not be foreseen by the person skilled in the art, it has been discovered that the rubber compositions according to the invention, reinforced with a white filler and containing as coupling agent a multifunctionalized polyorganosiloxane bearing at least one alkoxy function and at least one thiol function, give satisfactory reinforcement properties equivalent to those observed in compositions of the prior art that use conventional polysulfurized organosilanes, in particular TESPT, as their coupling agents.

For almost identical coupling performances, the invention makes it possible to use coupling agent contents that can be very much lower than those customarily used in the case of the conventional TESPT-type polysulfurized organosilanes.

Unexpectedly, the above results are obtained without incurring any penalty in terms of "resistance to scorching" and therefore without any adverse effect on the processing of the compositions, despite the presence of the —SH thiol function.

The rubber compositions according to the invention therefore make it possible to produce vulcanized rubber compositions filled with white filler, which in general present an advantageous balance of properties compared with the known solutions of the prior art.

TABLE 1

| Composition No. | 1 | 2 | 3 | 4 |
|---|---|---|---|---|
| SBR (1) | 75 | 75 | 75 | 75 |
| BR (2) | 25 | 25 | 25 | 25 |
| Silica (3) | 80 | 80 | 80 | 80 |
| Si69 | | 6.4 | | |
| POS No. 1 | | | 4 | |
| POS No. 2 | | | | 4 |
| Aromatic oil (total) | 34 | 34 | 34 | 34 |
| ZnO | 2.5 | 2.5 | 2.5 | 2.5 |
| Stearic acid | 2 | 2 | 2 | 2 |
| Antioxidant (4) | 1.9 | 1.9 | 1.9 | 1.9 |
| DPG (5) | 1.5 | 1.5 | 1.5 | 1.5 |
| Sulfur | 1.1 | 1.1 | 1.1 | 1.1 |
| CBS (6) | 2 | 2 | 2 | 2 |

(1): SBR with 59.5% 1–2; 23% trans; 26.5% styrene; extended with 37.5% oil (Tg: −29° C.), expressed in dry SBR.
(2): BR with 4.3% 1–2; 2.7% trans; 93% cis 1–4 (Tg: −106° C.)
(3): Silica Zeosil 1165 MP from Rhone-Poulenc
(4): N-1,3-dimethylbutyl-N-phenyl-para-phenylenediamine
(5): diphenylguanidine
(6): N-cyclohexyl-2-benzothiazyl-sulphenamide

TABLE 2

| Composition No. | 1 | 2 | 3 | 4 |
|---|---|---|---|---|
| Properties before curing: | | | | |
| Mooney (MU) | 81 | 53 | 56 | 58 |
| Scorching time T5 (min) | 16 | >3 | >30 | >30 |
| Properties after curing: | | | | |
| M10 (MPa) | 7.07 | 3.91 | 3.82 | 4.1 |
| M100 (MPa) | 1.12 | 1.32 | 0.79 | 2 |
| M300 (MPa) | 0.69 | 1.62 | 0.59 | 1.2 |
| M300/M100 | 0.62 | 1.23 | 0.75 | 4 |
| | | | | 1.4 |
| HL (%) | 44 | 26 | 37 | 5 |
| | | | | 1.1 |
| Breaking stress (MPa) | 17 | 24 | 18 | 7 |
| Elongation at break (%) | 1020 | 700 | 1000 | 28 |
| | | | | 24 |
| | | | | 750 |

TABLE 3

| Composition No. | 5 | 6 | 7 |
|---|---|---|---|
| Natural rubber | 100 | 100 | 100 |
| Silica (1) | 50 | 50 | 50 |
| Si69 | 3.2 | | |
| POS No. 1 | | 3.2 | |
| POS No. 2 | | | 3.2 |
| ZnO | 3 | 3 | 3 |
| Stearic acid | 2.5 | 2.5 | 2.5 |
| Antioxidant (2) | 1.9 | 1.9 | 1.9 |
| Sulfur | 1.5 | 1.5 | 1.5 |
| CBS (3) | 1.8 | 1.8 | 1.8 |

(1): Silica Zeosil 1165 MP from Rhône-Poulenc
(2): N-1,3-dimethylbutyl-N-phenyl-para-phenylenediamine
(3): N-cyclohexyl-2-benzothiazyl-sulphenamide

TABLE 4

| Composition No. | 5 | 6 | 7 |
|---|---|---|---|
| Properties before curing: | | | |
| Mooney (MU) | 53 | 54 | 48 |
| Scorching time T5 (min) | 24 | 27 | >30 |
| Properties after curing: | | | |
| M10 (MPa) | 3.89 | 3.74 | 4.19 |
| M100 (MPa) | 1.51 | 0.92 | 1.26 |
| M300 (MPa) | 1.58 | 0.71 | 1.18 |
| M300/M100 | 1.05 | 0.77 | 0.94 |
| HL (%) | 18 | 23 | 21 |
| Breaking stress (MPa) | 28 | 16 | 26 |
| Elongation at break (%) | 640 | 800 | 670 |

TABLE 5

| Composition No. | 8 | 9 |
|---|---|---|
| SBIR (1) | 100 | 100 |
| N234 | 30 | 30 |
| Silica (2) | 50 | 50 |
| POS (3) | | 4 |
| Aromatic oil | 35 | 35 |
| ZnO | 2.5 | 2.5 |
| Stearic acid | 2 | 2 |
| Antioxidant (4) | 1.9 | 1.9 |
| DPG (5) | 1.5 | 1.5 |
| Sulfur | 1.1 | 1.1 |
| CBS (6) | 2 | 2 |

(1): SBIR with 20% butadiene units (45% 1–2 and 45% trans), 44% isoprene units (39% cis, 24% trans and 37% 3–4) and 36% styrene units (Tg: −23° C.).
(2): Silica Zeosil 1165 MP from Rhône-Poulenc
(3): POS No. 4
(4): N-1,3-dimethylbutyl-N-phenyl-para-phenylenediamine
(5): diphenylguanidine
(6): N-cyclohexyl-2-benzothiazyl-sulphenamide

TABLE 6

| Composition No. | 8 | 9 |
|---|---|---|
| Properties before curing: | | |
| Mooney (MU) | 62 | 37 |
| Scorching time T5 (min) | 24 | 11 |
| Curing at 150° C. (min): | 25 | 15 |
| M10 (MPa) | 4.67 | 4.47 |
| M100 (MPa) | 0.95 | 1.39 |
| M300 (MPa) | 0.82 | 1.62 |
| M300/M100 | 0.86 | 1.17 |
| HL (%) | 46 | 36 |
| Breaking stress (MPa) | 16 | 19 |
| Elongation at break (%) | 860 | 750 |

TABLE 7

| Composition No. | 10 | 11 |
|---|---|---|
| SBR (1) | 100 | 100 |
| Alumina (2) | 120 | 120 |
| POS (3) | | 4 |
| Aromatic oil (total) | 37.5 | 37.5 |
| ZnO | 2.5 | 2.5 |
| Stearic acid | 2 | 2 |
| Antioxidant (4) | 1.9 | 1.9 |
| Sulfur | 1.1 | 1.1 |
| CBS (5) | 2 | 2 |

(1): SBR with 78% butadiene units (16% 1–2; 70% 1–4 trans; 14% 1–4 cis) and 22% styrene units; SBR extended with 37.5% oil, amount expressed in dry SBR (Tg: −50° C.).
(2): γ alumina type CR125 from Baikowski (BET = 105 m²/g)
(3): POS No. 4
(4): N-1,3-dimethylbutyl-N-phenyl-para-phenylenediamine
(5): N-cyclohexyl-2-benzothiazyl-sulphenamide

TABLE 8

| Composition No. | 10 | 11 |
|---|---|---|
| Properties before curing: | | |
| Mooney (MU) | 64 | 47 |
| Scorching time T5 (min) | >30 | 15 |
| Curing at 150° C. (min): | 40 | 40 |
| M10 (MPa) | 4.93 | 4.47 |
| M100 (MPa) | 1.06 | 1.50 |
| M300 (MPa) | 0.70 | 1.81 |
| M300/M100 | 0.66 | 1.21 |
| HL (%) | 35 | 29 |
| Breaking stress (MPa) | 19 | 23 |
| Elongation at break (%) | 970 | 600 |

What is claimed is:

1. A sulfur-vulcanizable rubber composition comprising at least one diene elastomer, a white reinforcing filler, and a coupling agent bearing at least two functions Y and X, wherein the coupling agent binds to the white filler through the Y function and to the elastomers through the X function, characterized in that said coupling agent comprises a multifunctionalized polyorganosiloxane (POS) comprising, per molecule:
   a) a first siloxyl unit, bearing on the silicon atom, at least one straight-chain or branched $C_1$ to $C_{15}$ alkoxy radical termed (i) (Y function) and
   b) a second siloxyl unit bearing, on the silicon atom, at least one radical termed (2i) having the general formula Z—SH (the X function), Z being a straight-chain or branched divalent hydrocarbon binding group.

2. A composition according to claim 1, in which the POS further comprises a third functionalized siloxyl unit bearing on the silicon atom, at least one radical termed (3i) (W function) comprising an ethylenically unsaturated $C_2$ to $C_{30}$ hydrocarbon chain from which the X function is derived by a sulfurization reaction, said ethylenically unsaturated chain being linked to the silicon atom by an Si—C bond.

3. A composition according to claims 1 or 2, in which the radical (i) is a $C_1$–$C_6$ alkoxy, and the group Z is a straight-chain or branched $C_2$–$C_{10}$ alkylene, or an alkylene-cycloalkylene, the alkylene part of which is a straight chain or branched $C_2$ to $C_{10}$ alkylene and the cyclic part of which comprises 5 to 12 carbon atoms.

4. A composition according to claim 3 in which radical (i) is selected from the group consisting of methoxy, ethoxy and (iso) propoxy.

5. A composition according to claim 1 in which the multifunctionalized POS comprises, per molecule:
   a) a first functional siloxyl unit of the formula:

in which:
   i=0, 1 or 2; p=1, 2 or 3; with the proviso that (i+p)=1, 2 or 3;
   R, which may be identical or different when i=2, is a monovalent hydrocarbon radical selected from among straight-chain or branched $C_1$–$C_6$ alkyls and/or aryls;
   Y which may be identical or different when p=2 or 3 is a radical (i) and;
   b) a second functional siloxyl unit of the formula:

in which:
   j=0, 1 or 2; q=1,2 or 3; with the proviso that (j+q)=1,2 or 3;
   R has the same definition as for formula (I),
   X which may be identical or different when q=2 or 3 is a radical (2i).

6. A composition according to claim 2 in which the multifunctionalized POS comprises, per molecule:
   a) a first functional siloxyl unit of the formula:

in which:
   i=0, 1 or 2; p=1, 2 or 3; with the proviso that (i+p)=1, 2 or 3;
   R, which may be identical or different when i=2, is a monovalent hydrocarbon radical selected from among straight-chain or branched $C_1$–$C_6$ alkyls and/or aryls;
   Y which may be identical or different when p=2 or 3 is a radical (i) and;
   b) a second functional siloxyl unit of the formula:

in which:
   j=0, 1 or 2; q=1, 2 or 3; with the proviso that O+q) 1, 2 or 3;
   R has the same definition as for formula (I),
   X which may be identical or different when q=2 or 3 is a radical (2i).

7. A composition according to claims 6 or 7 in which R is methyl, ethyl, propyl, butyl, or phenyl.

8. A composition according to claim 6 in which the third functionalized siloxy unit of the multifunctionalized POS comprises a molecule of the formula III:

in which:
   k=0, 1 or 2; r=1, 2 or 3; with the proviso that (k+r)=1, 2 or 3;
   R has the same definition as for the substituent R of formula (II);
   W, which may be identical or different when r=2 or 3 is the radical (3i).

9. A composition according to claim 8, in which the multifunctionalized POS is a straight-chain POS of formula (IV) incorporating along the polysiloxane chain at least the following units in the following proportions:

R, Y, W and X being identical or different, respectively, and the numbers a, b and c, which may be integers or fractions, satisfying the following conditions: a=1 to 150; b=0 to 85; c=1 to 100; a+b+c=2 to 300.

10. A composition according to claim 9, in which the multifunctionalized POS is a straight-chain POS of the formula (IV-1):

in which end groups A, which may or may not bear functions y, x or w, may be $(R_{i'}Y_{p'}SiO—)$ and/or $(R_{j'}X_{q'}SiO—)$ and/or $(R_{k'}W_{r'}SiO—)$ and end group B, which may or may not bear functions y, x or w, may be $(—SiR_{i'}Y_{p'})$ and/or $(—SiR_{j'}X_{q'})$ and/or $(—SiR_{k'}W_{r'})$,
wherein:
i'=0, 1, 2 or 3; p'=0, 1, 2 or 3; with the proviso that (i'+p')=3;
j'=0, 1, 2 or 3; q'=0, 1, 2 or 3; with the proviso that (j'+q')=3;
k'=0, 1, 2 or 3; r'=0, 1, 2 or 3; with the proviso that (k'+r')=3; and
R, Y, W and X being identical or different, respectively, when present in A and/or B.

11. A composition according to claims 9 or 10, in which R is methyl or ethyl, Y is methoxy or ethoxy, W is radical (3i-1) or (3i-2):

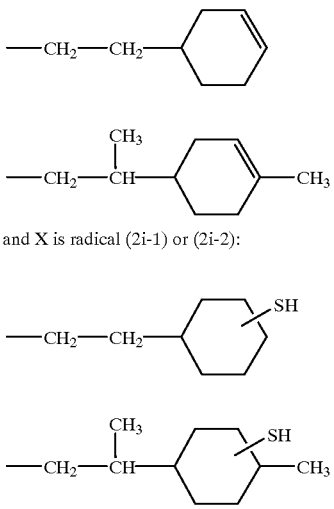

12. A composition according to claim 11, in which R is methyl, Y is ethoxy, W is ethylene-cyclohexenyl(radical 3i-1), X is ethylene-cyclohexylene (radical 2i-1), and =1 to 50; b=0 to 30; c=1 to 40, and a+b+c=10 to 100.

13. A composition according to claim 1, in which the diene elastomer is selected from the group consisting of polybutadienes, polyisoprenes or natural rubber, butadiene-styrene copolymers, butadiene-isoprene copolymers, isoprene-styrene copolymers, butadiene-styrene-isoprene copolymers, and a mixture of two or more of these elastomers.

14. A composition according to claim 13, in which the diene elastomer is a butadiene-styrene copolymer having a styrene content of between 20% and 30% by weight, vinyl bond content of the butadiene part of between 15% and 65%, of trans-1,4 bond contact of between 20% and 75%, and a glass transition temperature of between −20° C. and −55° C.

15. A composition according to claim 14 in which the butadiene-styrene copolymer is in a mixture with a polybutadiene having a cis 1,4 bond content of greater than 90%.

16. A composition according to claim 1, in which the white filler constitutes a majority of the total reinforcing filler.

17. A composition according to claim 1, in which the white filler comprises silica.

18. A composition according to claim 1, in which the white filler comprises alumina.

19. A composition according to claim 1, in which the white filler comprises a mixture of silica and alumina.

20. A tire or rubber article, comprising a rubber composition according to claims 1 or 2.

21. A rubber article according to claim 20 selected from the group consisting of treads, underlays, sidewalls, beads, protectors, inner tubes and airtight internal rubbers for tubeless tires.

22. A process for ensuring the coupling of a white reinforcing filler to elastomer in diene rubber compositions reinforced by the white filler, comprising incorporating by mixing a multifunctionalized polyorganosiloxane (POS) into the composition, said POS comprising, per molecule
   a) a first siloxyl unit, bearing on the silicon atom, at least one straight-chain or branched $C_1$ to $C_{15}$ alkoxy radical (i) (Y function), and
   b) a second siloxyl unit bearing, on the silicon atom, at least one radical having the (2i) general formula Z—SH (the X function), Z being a straight-chain or branched divalent hydrocarbon binding group,
and vulcanizing the composition.

* * * * *

UNITED STATES PATENT AND TRADEMARK OFFICE
CERTIFICATE OF CORRECTION

PATENT NO.    : 6,313,205 B1
DATED         : November 6, 2001
INVENTOR(S)   : Chiron et al.

It is certified that error appears in the above-identified patent and that said Letters Patent is hereby corrected as shown below:

Title page,
Item [73], Assignee, "Generale" should read -- Générale --
Item [57], ABSTRACT,
Line 10, "hydracarbon" should read -- hydrocarbon --

Column 1,
Line 11, "sulfur-vulcanizablerubber" should read -- sulfur-vulcanizable rubber --
Line 19, "(Multi)functionalizedPOS" should read -- (Multi)functionalized POS --
Line 21, "multifunctionalisation" should read -- multifunctionalization --

Column 3,
Line 24, "polysulftirized" should read -- polysulfurized --
Line 40, "ethylradical" should read -- ethyl radical --
Line 41, "propylradical" should read -- propyl radical --

Column 4,
Line 44, "$C_4$;" should read -- $C_4$; --
Line 46, "$C_7$;" should read -- $C_7$; --

Column 6,
Line 19, "norbomene" should read -- norbornene --

Column 7,
Line 16, "of" should be deleted.

Column 8,
Line 8, "Ba" should be deleted.
Line 9, "ikowski" should read -- Baïkowski --

Column 9,
Line 21, "p=2or" should read -- p=2 or --
Line 28, "2or" should read -- 2 or --

Column 12,
Lines 49-50, "heterogenous" should read -- heterogeneous --

UNITED STATES PATENT AND TRADEMARK OFFICE
CERTIFICATE OF CORRECTION

PATENT NO. : 6,313,205 B1
DATED : November 6, 2001
INVENTOR(S) : Chiron et al.

It is certified that error appears in the above-identified patent and that said Letters Patent is hereby corrected as shown below:

Column 13,
Line 14, "heterogenous" should read -- heterogeneous --

Column 14,
Line 40, "synthesised" should read -- synthesized --
Line 52, "divinyltetramethyldisiloxaneof" should read -- divinyltetrametheyldisiloxane of --

Column 15,
Line 60, "a" should read -- an --

Column 19,
Line 11, "compositionNo. 5" should read -- composition No. 5 --
Line 12, "compositionNo. 6" should read -- composition No. 6 --
Line 13, "compositionNo. 7" should read -- composition No. 7 --
Line 31, "isoprenecopolymer" should read -- isoprene copolymer --

Column 21,
Table 2,

"Table 2

| Composition No. | 1 | 2 | 3 | 4 |
|---|---|---|---|---|
| *Properties before curing:* | | | | |
| Mooney (MU) | 81 | 53 | 56 | 58 |
| Scorching time T5 (min) | 16 | >3 | >30 | >30 |
| *Properties after curing:* | | | | |
| M10 (MPa) | 7.07 | 3.91 | 3.82 | 4.12 |
| M100 (MPa) | 1.12 | 1.32 | 0.79 | 1.24 |
| M300 (MPa) | 0.69 | 1.62 | 0.59 | 1.45 |
| M300/M100 | 0.62 | 1.23 | 0.75 | 1.17 |
| HL (%) | 44 | 26 | 37 | 28 |
| Breaking stress (MPa) | 17 | 24 | 18 | 24 |
| Elongation at break (%) | 1020 | 700 | 1000 | 750 |

"

UNITED STATES PATENT AND TRADEMARK OFFICE
CERTIFICATE OF CORRECTION

PATENT NO. : 6,313,205 B1  
DATED : November 6, 2001  
INVENTOR(S) : Chiron et al.

Page 3 of 4

It is certified that error appears in the above-identified patent and that said Letters Patent is hereby corrected as shown below:

Column 21 cont'd, should read
-- Table 2

| Composition No. | 1 | 2 | 3 | 4 |
|---|---|---|---|---|
| *Properties before curing:* | | | | |
| Mooney (MU) | 81 | 53 | 56 | 58 |
| Scorching time T5 (min) | 16 | >3 | >30 | >30 |
| *Properties after curing:* | | | | |
| M10 (MPa) | 7.07 | 3.91 | 3.82 | 4.12 |
| M100 (MPa) | 1.12 | 1.32 | 0.79 | 1.24 |
| M300 (MPa) | 0.69 | 1.62 | 0.59 | 1.45 |
| M300/M100 | 0.62 | 1.23 | 0.75 | 1.17 |
| HL (%) | 44 | 26 | 37 | 28 |
| Breaking stress (MPa) | 17 | 24 | 18 | 24 |
| Elongation at break (%) | 1020 | 700 | 1000 | 750 |

--

Column 23,  
Line 9, "unit, bearing" should read -- unit bearing, --  
Line 17, "bearing" should read -- bearing, --  
Line 50, "2;q=1,2" should read -- 2; q=1, 2 --; and "(j+q)=1,2" should read -- (j+q)=1, 2 --  
Line 23, "X" should read -- X, --

Column 24,  
Line 1, "Y" should read -- Y, --  
Line 8, "0+q)" should read -- (j+q) --  
Line 11, "X" should read -- X, --

UNITED STATES PATENT AND TRADEMARK OFFICE
CERTIFICATE OF CORRECTION

PATENT NO.    : 6,313,205 B1
DATED         : November 6, 2001
INVENTOR(S)   : Chiron et al.

It is certified that error appears in the above-identified patent and that said Letters Patent is hereby corrected as shown below:

<u>Column 24 cont'd,</u>
Line 46, "(IV)" should read -- (IV-1) --
Line 49, "y, x or w" should read -- Y, X or W --
Line 51, "y, x" should read -- Y, X --
Line 52, "w," should read -- W, --

Signed and Sealed this

Twenty-fifth Day of March, 2003

JAMES E. ROGAN
*Director of the United States Patent and Trademark Office*